Sept. 22, 1931.  J. J. NOETH ET AL  1,824,362
FOOD TOASTER
Filed April 11, 1927

Inventors:
JOHN J. NOETH
FRED'K E. HUMMEL
By Stevens & Batchelor
Attys.

Patented Sept. 22, 1931

1,824,362

UNITED STATES PATENT OFFICE

JOHN J. NOETH AND FREDERICK E. HUMMEL, OF CHICAGO, ILLINOIS

FOOD TOASTER

Application filed April 11, 1927. Serial No. 182,801.

Our invention relates to electric bread toasters and more particularly to the supporting means for the bread or other food received therein, it being our main object to provide a novel support, which prevents the bread from becoming burned after the period allotted for the toasting operation has passed.

A further object of the invention is to provide a support for the bread which is remote from the toasting elements, making the manual deposit and removal of the bread safe.

A still further object of the invention is to design the novel support appreciably narrower than the toasting elements, so that the fingers may gain a firm hold on the bread while at a safe distance from the edges of the support, when depositing or removing the bread.

Another object of our invention is to dispose the novel support in such a manner that it will not interfere with the toasting operation in any way.

A final, but nevertheless important object of the invention is to construct the novel support in one extremely simple and compact unit, which adds but slightly to the cost of the toaster.

With the above objects in view and any others that may suggest themselves from the specification and claims to follow, a better understanding of the invention may be gained by reference to the accompanying drawings, in which—

Figure 1:
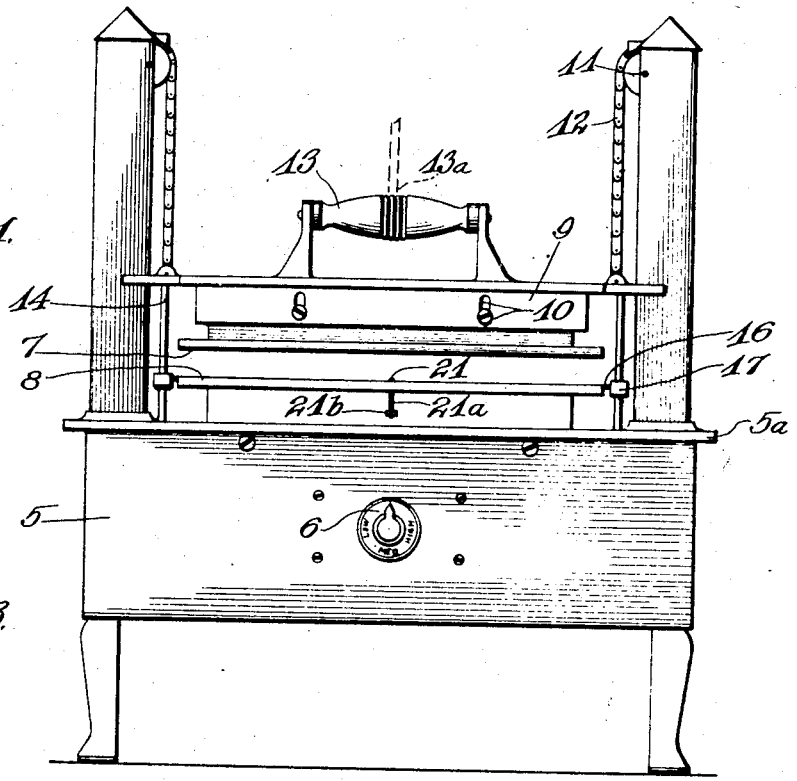
Figure 1 is an elevation of an electric toaster in operating position, showing the application of the novel support.

Referring specifically to the drawings, 5 denotes the base of the toaster, which contains a switch 6 and other electrical connections for the supply and control of electric current from a suitable source to a pair of toaster plates 7 and 8. These plates are in spaced and superposed relation, being designed to receive between them the bread slices, sandwiches or other food to be toasted. The toasting operation occurs when the plates are in flat engagement with the food, and in order that good contact may be had in this connection, we suspend the plate 7 loosely from a head piece 9 by the pin-and-slot connection 10 illustrated—or by—equivalent means—so that the plate 7 may more fully cover the food as it settles thereon preparatory to the toasting process.

The head piece 9 is preferably counterweighted by a suitable arrangement inside the toaster base—which we did not deem it necessary to illustrate—acting through the agency of elevated pulleys 11 and suspension chains 12. It is thus an easy matter for the attendant to raise or lower the head piece by means of a handle 13 to any desired position, and to leave it suspended in such position.

The head piece 9 carries depending rods 14 to guide it in its vertical motion, these rods slidably entering the top plate 5a of the base 5 through perforations 15 therein.

The novel food support is generally in the form of a grid, and is disposed between the toaster plates 7 and 8. The support is mainly formed of a set of parallel wires 16 positioned in a horizontal plane and secured across the ends by tie bars 17. The latter are perforated at 18 and mounted to receive and slide upon the rods 14, so that the support as a whole is movable vertically between the toaster plates.

Figure 2:
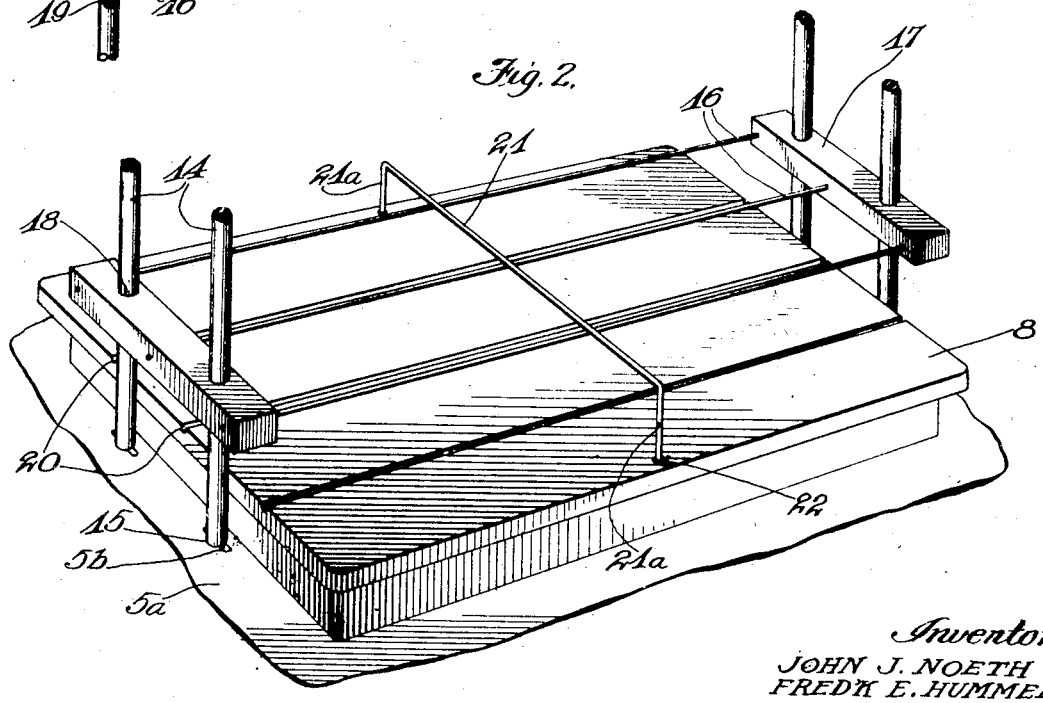
Fig. 2 shows the support in another position.

When the head piece 9 is raised to permit the insertion or removal of the food, stop pins 19—or equivalent elements—carried by the rods 14 become effective next under the end bars 17 of the novel support or grid at a predetermined time to raise the same a short distance above the toaster plate 8, as indicated in Figure 2. The position of the stop pins 19 is ordinarily within the base 5, and they rise a considerable distance—corresponding to the separating extent of the toaster plate 7 from the plate 8 necessary to provide sufficient room for the insertion and removal of the food—before they pick up the support or grid, the travel of the latter being contemporaneous with the final portion of the ascent of the toaster plate 7. The food is now deposited upon the support and the toaster plate 7 in turn deposited upon the food as previously mentioned. As the downstroke of the plate 7 commences, the support follows of its weight and meets the toaster plate 8, the toaster plate 7 continuing its descent until it comes to a stop on the food.

The wires 16 of the support do not seat on the flat top of the toaster plate 8 but within correspondingly-located grooves or channels 20 cut in the latter. These grooves are of a depth to completely sink the said wires, so that the food now rests not only on the latter but upon the entire flat surface of the toaster plate 8, thereby receiving the necessary heat contact both above and below.

Figure 3:
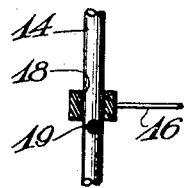
Fig. 3 is a section of a detail.

Figure 3 clearly shows the elevated position of the novel support or grid, such as when the toasting operation has been completed. The food is now spaced from the toaster plate 8, so that it receives no more toasting heat therefrom. Obviously, the plate would contain ample residual heat to burn the food if left thereon, even though the electric current had been turned off. With the food elevated on the novel support, however, burning cannot occur; on the other hand, residual heat of the toaster plate 8 will keep the food warm until the attendant desires or finds time to remove it. It will also be noted that the support is appreciably narrower than the toaster plates, which facilitates the deposit or removal of the food with the fingers exerting a substantial hold thereon yet safe from contact with a heated part. The food can thus be handled and replaced more rapidly, as the attendant is not obliged to exercise undue care in the above connection.

In the toaster illustrated, the food capacity is for two bread slices, sandwiches or other units, laid side by side. Due to the corresponding length of the support, we prefer to brace it medially by surmounting the wires 16 with a wire arch 21 secured to each of the support wires by brazing or other heat resisting means. The legs 21a of the arch work in guide perforations 22 in the toaster plate 8 as the support descends or rises, and carry nuts 21b or other stops at their lower ends to limit their ascent.

The perforations 15 in the top plate 5a are laterally extended on opposite sides—as indicated at 5b—to permit the stop pins 19 to enter or leave the base 5 with the motion of the rods 14. As to the toaster, a commercial form may employ an automatic timing device to lift the head piece 9 at the proper time, and for such an adjunct a connection with the handle 13 may be made through a rod or other suitable element indicated by dotted lines at 13a.

A food support is thus had which is extremely simple, does not hinder the working efficiency of the toasting apparatus, is not in the way, and facilitates the safe and rapid handling of the food.

While we have illustrated and described the novel improvement in the preferred form, it will be seen that the same is capable of many minor changes and refinements, and we therefore wish to claim all such changes and refinements as coming within the scope and spirit of the appended claims.

We claim:

1. A food toaster comprising a base, a lower heat plate mounted thereon, an upper heat plate adapted to approach and recede from the lower heat plate, depending guide rods carried by the upper heat plate, and a food support disposed between the heat plates and slidably carried by said guide rods.

2. A food toaster comprising a heat plate, and a food-supporting grid above the latter, said grid embodying a series of longitudinal strips, said heat plate having a similar series of surface grooves to seat said strips when the grid is lowered upon the heat plate, upstanding guides located beyond the ends of said heat plate, and a slidable connection between said grid and guides.

3. A food toaster comprising a heat plate, an elongated grid, guides at the ends of the grid for the motion of the latter toward and from the heat plate, and an auxiliary guiding element for the grid at an intermediate point thereof.

4. A food toaster comprising a perforated heat plate, an elongated grid, guides at the ends of the grid for the motion of the latter toward and from the heat plate, and a medial reinforcing arch for the grid, said arch having terminal sections depending into the perforations of the heat plate for the guidance of the grid.

5. A food toaster comprising a perforated heat plate, an elongated grid, guides at the ends of the grid for the motion of the latter toward and from the heat plate, a medial reinforcing arch for the grid, said arch having terminal sections depending through the perforations of the heat plate for the guidance of the grid, and stops carried by the ends of said terminal sections to prevent the separation of the latter from the heat plate.

6. A food toaster comprising a heat plate, an elongated grid disposed thereover and extending at each end beyond the ends of the plate, vertically disposed guide bars spaced from each end of said plate, guides carried by each end of said grid and slidable over said guide bars, a central bar in said grid and extending laterally from the sides thereof, and means at each end of said bar having slidable guiding engagement with said plate.

7. A food toaster comprising a base, a lower heat plate mounted thereon, an upper heat plate adapted to approach and recede from the lower heat plate, guides carried by the upper heat plate and slidably engaged in said base, stop members formed on said guides and a food supporting member slidable over said guides between said plates and adapted to be seated on said stop members.

In testimony whereof we affix our signatures.

JOHN J. NOETH.
FREDERICK E. HUMMEL.